United States Patent
Chen

(10) Patent No.: US 11,847,157 B2
(45) Date of Patent: Dec. 19, 2023

(54) TELESCOPE STAR SEARCHING METHOD AND DEVICE BASED ON IMAGE RECOGNITION AND TELESCOPE

(71) Applicant: Jiazhi Chen, Suzhou (CN)

(72) Inventor: Jiazhi Chen, Suzhou (CN)

( * ) Notice: Subject to any disclaimer, the term of this patent is extended or adjusted under 35 U.S.C. 154(b) by 320 days.

(21) Appl. No.: 17/275,352

(22) PCT Filed: Sep. 13, 2018

(86) PCT No.: PCT/CN2018/105506
§ 371 (c)(1),
(2) Date: Mar. 11, 2021

(87) PCT Pub. No.: WO2020/051838
PCT Pub. Date: Mar. 19, 2020

(65) Prior Publication Data
US 2022/0050868 A1 Feb. 17, 2022

(51) Int. Cl.
*G06F 16/53* (2019.01)
*G06V 10/60* (2022.01)
(Continued)

(52) U.S. Cl.
CPC .......... *G06F 16/53* (2019.01); *G01J 1/0266* (2013.01); *G02B 23/16* (2013.01); *G06V 10/30* (2022.01);
(Continued)

(58) Field of Classification Search
CPC ...... G06F 16/53; G06F 16/587; G01J 1/0266; G02B 23/16; G06V 10/30; G06V 10/60; G06V 10/751; G06V 20/13; G01S 3/7867
See application file for complete search history.

(56) References Cited

U.S. PATENT DOCUMENTS 8,477,419 B1 * 7/2013 Medley ................. G01S 3/7867
359/429
11,587,311 B2 * 2/2023 Shaddix ............. G06V 10/7515
(Continued)

FOREIGN PATENT DOCUMENTS

CN 101393027 A 3/2009
CN 103837126 A 6/2014
(Continued)

OTHER PUBLICATIONS

International Search Report dated Jun. 13, 2019 for PCT/CN2018/105506.

*Primary Examiner* — Angelica Ruiz
(74) *Attorney, Agent, or Firm* — Schmeiser, Olsen & Watts, LLP

(57) ABSTRACT

Provided is a telescope star searching method and device based on image recognition and telescope. The method includes: using a telescope to photograph a starry sky image; identifying a star in the starry sky image and matching a right ascension and a declination of the identified star according to a star database; obtaining a first altitude/azimuth angle according to photographing time of the starry sky image, a location of an imaging apparatus at the photographing time, and the right ascension and the declination of the identified star; matching a right ascension and a declination of a target star in the star database; obtaining a second altitude/azimuth angle according to current time, a current location of the imaging apparatus, and the right ascension and the declination of the target star; and adjusting the telescope from the first altitude/azimuth angle to the second altitude/azimuth.

17 Claims, 5 Drawing Sheets

(51) Int. Cl.
    *G06V 10/75*     (2022.01)
    *G06V 10/30*     (2022.01)
    *G06V 20/13*     (2022.01)
    *G01J 1/02*     (2006.01)
    *G02B 23/16*     (2006.01)

(52) U.S. Cl.
    CPC ............ *G06V 10/60* (2022.01); *G06V 10/751* (2022.01); *G06V 20/13* (2022.01)

(56) References Cited

U.S. PATENT DOCUMENTS

| | | | |
|---|---|---|---|
| 2006/0238860 A1* | 10/2006 | Baun | G02B 23/16 359/429 |
| 2006/0238861 A1* | 10/2006 | Baun | G02B 23/00 359/430 |
| 2007/0115545 A1* | 5/2007 | Chen | G02B 23/16 359/429 |
| 2017/0366264 A1* | 12/2017 | Riesing | H04B 10/118 |
| 2018/0093133 A1 | 4/2018 | Decarlo | |
| 2018/0172796 A1* | 6/2018 | Kechler | G01S 3/7864 |

FOREIGN PATENT DOCUMENTS

| | | | |
|---|---|---|---|
| CN | 108226960 A | 6/2018 | |
| WO | 2016086904 A1 | 6/2016 | |

* cited by examiner

TELESCOPE STAR SEARCHING METHOD AND DEVICE BASED ON IMAGE RECOGNITION AND TELESCOPE

CROSS-REFERENCE TO RELATED APPLICATIONS

This application claims priority to PCT Application No. PCT/CN2018/105506, having a filing date of Sep. 13, 2018, the entire contents of which is hereby incorporated by reference.

FIELD OF TECHNOLOGY

The following relates to the field of astronomical telescope, in particular relates to a telescope star searching method and device based on image recognition and telescope.

BACKGROUND

A telescope is an optical instrument that uses lenses or mirrors and other optical devices to observe distant objects. The light passing through the lens is refracted or the light is reflected by the concave mirror to make it enter a small hole and converge for imaging, and then pass through a magnifying eyepiece to be seen.

The telescope equipment needs to adjust an angle of the telescope lens before searching the stars, so that the target star to be searched appears in the lens. In the conventional art, after the telescope is turned on, error correction is required in advance, and then the equatorial mount and a series of angle sensors such as gyroscopes are used for detection and tracking in the process of searching stars. However, the equatorial mount is bulky and expensive, and cannot ensure that there is no off-line when tracking stars.

SUMMARY

An aspect relates to a telescope star searching method and device based on image recognition and telescope, which calculates a reference angle using a starry sky image photographed at will, calculates a target angle using a target star, and confirms the differences between two angles as angle adjustment value to achieve rapid star searching. The technical solution is as follows:

on the one hand, the present disclosure provides a telescope star searching method based on image recognition, comprising:

photographing a starry sky image by using an imaging sensor of a telescope, where the starry sky image includes at least three stars;

identifying a star in the photographed starry sky image and matching a right ascension and a declination of the identified star according to a star database;

obtaining a first altitude angle and a first azimuth angle according to a photographing time of the starry sky image, a location of an imaging apparatus, and the right ascension and the declination of the identified star;

matching a right ascension and a declination of a target star in the star database;

obtaining a second altitude angle and a second azimuth angle according to a current location of the imaging apparatus and the current time, and the right ascension and the declination of the target star;

adjusting the altitude angle of the telescope from the first altitude angle to the second altitude angle, and adjusting the azimuth angle of the telescope from the first azimuth angle to the second azimuth angle.

Further, the first altitude angle is calculated by following formula:

$\sin(h1)=\sin(w1)\times\sin(cw1)+\cos(w1)\times\cos(cw1)\times\cos(t1\times 15)$, wherein, h1 is the first altitude angle, w1 is a latitude of the location of the imaging apparatus at photographing time of the starry sky image, cw1 is the declination of the identified star, and t1 is a celestial time angle of the identified star;

the second altitude angle is calculated by following formula:

$\sin(h2)=\sin(w2)\times\sin(cw2)+\cos(w2)\times\cos(cw2)\times\cos(t2\times 15)$, wherein, h2 is the second altitude angle, w2 is a latitude of the current location of the imaging apparatus, cw2 is the declination of the target star, and t2 is a celestial time angle of the target star.

Further, the celestial time angle of the identified star is calculated by following formula:

t1=100/15+n1×24/365.2422+T1'−cj1/15, wherein, n1 is number of days from New Year's Day in the current year to photographing time of the starry sky image, T1' is a time conversion value of the photographing time of the starry sky image at the current location of the imaging apparatus, and cj1 is the right ascension of the identified star;

Further, the celestial time angle of the target star is calculated by following formula:

t2=100/15+n2×24/365 0.2422+T2'−cj2/15, wherein, n2 is number of days from New Year's Day in the current year to observation time of the target star, T2' is a time conversion value of the observation time of the target star at the current location of the imaging apparatus, and cj2 is the right ascension of the target star.

Further, the first azimuth angle is calculated by following formula:

$\cos(f1)=\sin(cw1)/(\cos(w1)\times\cos(h1)-\tan(w1)\times\tan(h1))$, wherein, f1 is the first azimuth angle, cw1 is the declination of the identified star, w1 is the latitude of the location of the imaging apparatus at photographing time of the starry sky image, and h1 is the first altitude angle;

the second azimuth angle is calculated by following formula:

$\cos(f2)=\sin(cw2)/(\cos(w2)\times\cos(h2)-\tan(w2)\times\tan(h2))$, wherein, f2 is the second azimuth angle, cw2 is the declination of the target star, w2 is the latitude of the current location of the imaging apparatus, and h2 is the second altitude angle.

Further, identifying a star in the photographed starry sky image according to a star database comprises:

taking one of the at least three stars included in the starry sky image as a reference star;

looking for two other stars in the starry sky image, forming a triangle with the reference star, and obtaining a proportional relationship of side lengths of the triangle;

searching for a combination of three stars in the star database that satisfies the proportional relationship of side lengths of the triangle, the number of the combination is one or more;

if the number of the combination is more than one, further comprising:

taking a non-reference star that constitutes the triangle as a new reference star, to construct a new triangle having a different proportional relationship with other stars, and obtaining a proportional relationship of side lengths of the new triangle;

according to the star database, excluding a combination that does not satisfy the proportional relationship of side lengths of the new triangle among the combinations of three stars obtained by searching;

selecting a new reference star for one or more iterations to perform an exclusion operation until only one combination of three stars remains.

Further, identifying a star in the photographed starry sky image according to a star database comprises:

taking one of the at least three stars included in the starry sky image as a reference star;

looking for other N stars in the starry sky image, forming multiple line segments with the reference star to obtain a line segment proportional relationship;

searching for a combination of N+1 stars in the star database that satisfies the line segment proportional relationship, the number of the combination is one or more;

if the number of the combination is more than one, further comprising:

taking a non-reference star at one end of a line segment as a new reference star, to construct new line segment proportional relationship with other N stars;

according to the star database, excluding a combination that does not satisfy the new line segment proportional relationship among the combinations of N+1 stars obtained by searching;

selecting a new reference star for one or more iterations to perform an exclusion operation until only one combination of N+1 stars remains.

Further, before identifying a star in the photographed starry sky image according to a star database, it comprises: performing noise discriminant on each star in the photographed starry sky image, comprising:

finding a central pixel of a luminous body in the starry sky image, and recording its brightness as $P_{max}$;

using the central pixel as a center of a circle, and using r0 a radius to determine the circular range, calculating an average brightness in this range, and recording it as $P_0$;

if $P_{max}-P_0<k*P_{max}$, adjusting $r_0$ to $r_0+r_{step}$ until $P_{max}-P_0 \geq k*P_{max}$, wherein, k is a set value of noise reduction coefficient, and $r_{step}$ is a radius step adjustment value;

if $r_0 \geq r_{th}$, determining the luminous body to be a star, otherwise determining it to be a noise and deleting the pixel of the luminous body, wherein, $r_{th}$ is a set value of radius threshold, and $r_0$ is an adjusted new radius value.

Further, a time conversion value of a time at the current location of the imaging apparatus is calculated by following formula:

T'=T−ΔT=T−(sj−j)/15, wherein, T' is a time conversion value at the current location of the imaging apparatus, T is time-zone time, sj is a longitude of the time zone, and j is a longitude of the current location of the imaging apparatus.

On the other hand, the present disclosure provides a telescope star searching device based on image recognition, comprising: a photographing module, used for photographing a starry sky image by using an imaging sensor of a telescope, where the starry sky image includes at least three stars;

an image star identifying module, used for identifying a star in the photographed starry sky image and matching a right ascension and a declination of the identified star according to a star database;

a first calculation module, used for obtaining a first altitude angle and a first azimuth angle according to a photographing time of the starry sky image, a location of an imaging apparatus, and the right ascension and the declination of the identified star;

a target star information module, used for matching a right ascension and a declination of a target star in the star database;

a second calculation module, used for obtaining a second altitude angle and a second azimuth angle according to the current location of the imaging apparatus and the current time, and the right ascension and the declination of the target star;

an angle adjustment module, used for adjusting the altitude angle of the telescope from the first altitude angle to the second altitude angle, and adjusting the azimuth angle of the telescope from the first azimuth angle to the second azimuth angle.

On a third hand, the present disclosure provides a telescope using the star searching method above mentioned to search stars.

The beneficial effects brought about by the technical solution provided by the present disclosure are as follows:

1) after the telescope is turned on, there is no need to perform error calibration in advance, and the current altitude angle and azimuth angle can be calculated by photographing a star image at will;

2) the target altitude angle and target azimuth angle are calculated according to the target star, to obtain a adjustment angle of the telescope;

3) after calculating the target altitude angle and azimuth angle, the angle of the telescope is adjusted according to the differences between the target altitude angle and current altitude angle and the differences between the target azimuth angle and current azimuth angle of the photographed star image, there is no need to track, and fast star search is realized.

BRIEF DESCRIPTION

Some of the embodiments will be described in detail, with references to the following Figures, wherein like designations denote like members, wherein.

DETAILED DESCRIPTION

In order to enable those skilled in the art to better understand the solutions of the present disclosure, the technical solutions in the embodiments of the present disclosure are explained clearly and completely below in conjunction with the accompanying drawings, and apparently, the described embodiments are merely a part of the embodiments of the present disclosure, not all the embodiments. Based on the embodiments of the present disclosure, all other embodiments obtained by one of ordinary skill in the art without creative work fall within the protective scope of the present disclosure.

It should be noted that terms "first", "second" and the like in the description, the claims and the accompanying drawings of the present disclosure are used to distinguish similar objects, and do not have to be used to describe a specific order or sequence. It should be understood that the data so used can be interchanged under appropriate circumstances so that the embodiments of the present disclosure described herein can be implemented in an order other than those illustrated or described herein. In addition, the terms "comprise" and "have" and any variations thereof are intended to cover non-exclusive inclusions, for example, processes, methods, devices, products or equipment that include a series of steps or units are not necessarily limited to those clearly listed steps or units, but may include other steps or units not explicitly listed or inherent to these processes, methods, products or equipment.

Figure 1:
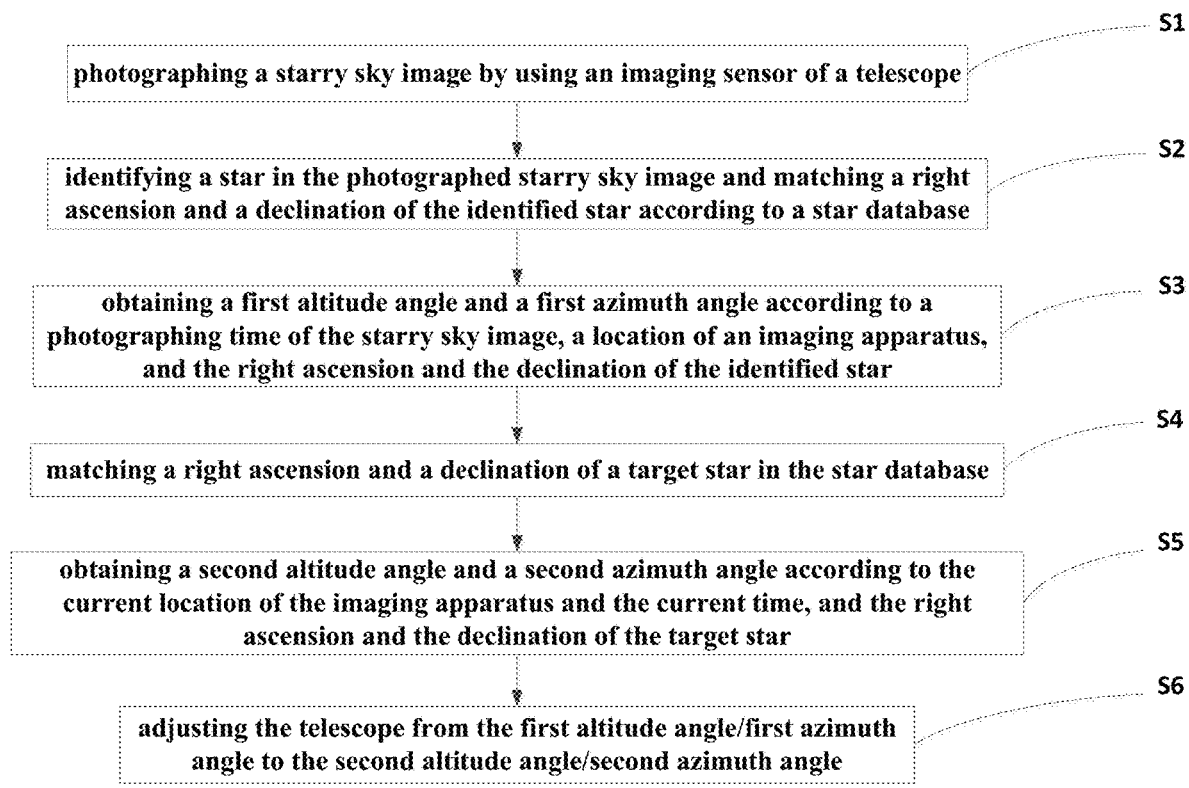
FIG. 1 is a flow chart of a telescope star searching method based on image recognition provided by an embodiment of the present disclosure.

In an embodiment of the present disclosure, a telescope star searching method based on image recognition is provided, referring to FIG. 1, the method comprises the following procedures:

S1, photographing a starry sky image by using an imaging sensor of a telescope, where the starry sky image includes at least three stars.

An imaging apparatus or camera sensor can be used to take photos of starry sky observed by a lens under the current field of view of the telescope to obtain a starry sky image. In an embodiment, the imaging apparatus or camera sensor is a CCD sensor or a CMOS sensor.

S2, identifying a star in the photographed starry sky image and matching a right ascension and a declination of the identified star according to a star database.

Image recognition based on the star database is performed to analyze which specific star in the star database corresponds to a star existing in the starry sky image, the star database can also query the right ascension and declination information of the star, for example, the coordinates of Sirius on the celestial sphere are right ascension 06 h 45 m 08.9173 s and declination −16° 42′58.017″ (epoch 2000.0).

In the second equatorial coordinate system, the location of a celestial body is represented by longitude/latitude according to regulations, called ascension ($\alpha$) and declination ($\delta$). Declination is the difference between the location of a celestial body and the location of a celestial equator, the value of declination is from −90 degrees to +90 degrees, the degree north of the celestial equator is a positive degree, and on the contrary, the degree south of the celestial equator is a negative degree. Right ascension is similar to an angular distance of the earth's longitude, and is used together with declination to determine a location of a celestial body in the celestial sphere. It is calculated from the vernal equinox to the east along the celestial equator. The declination similar to the latitude of the earth refers to an angular distance north or south of the celestial equator of the celestial body, and refers to the arc on the celestial equator between the circle of right ascension passing through the vernal equinox and the circle of right ascension circle passing through the celestial body, represented by $\alpha$. It is measured from the vernal equinox in the direction opposite to the diurnal apparent motion of the celestial sphere, from 0 h to 24 h.

S3, obtaining a first altitude angle and a first azimuth angle according to a photographing time of the starry sky image, a location of an imaging apparatus, and the right ascension and the declination of the identified star.

Specifically, the first altitude angle is calculated by following formula:

$\sin(h1)=\sin(w1)\times\sin(cw1)+\cos(w1)\times\cos(cw1)\times\cos(t1\times 15)$, wherein, h1 is the first altitude angle, w1 is the latitude of the location of the imaging apparatus at photographing time of the starry sky image, and cw1 is the declination of the identified star, and t1 is a celestial time angle of the identified star.

Wherein, the celestial time angle of the identified star is calculated by following formula:

$t1=100/15+n1\times24/365.2422+T1'-cj1/15$, wherein, t1 is the celestial time angle of the identified star, n1 is number of days from New Year's Day in the current year to photographing time of the starry sky image, T1' is the time conversion value of the photographing time of the starry sky image at the current location of the imaging apparatus, and cj1 is the right ascension of the identified star, for example, a starry sky image was taken at 22:00 Beijing time on Jan. 23, 2018, and the photographing location was Urumqi, so n1 is 23, and T1' is converted from Beijing time to Urumqi local time, the conversion formula is as follows:

$T'=T-\Delta T=T-(sj-j)/15$, wherein, T' is the time conversion value at the current location of the imaging apparatus, T is time-zone time, sj is the longitude of the time zone, and j is the longitude of the current location of the imaging apparatus. Taking the above Urumqi as an example, that is, the longitude of the location of the imaging apparatus was E87°37′23.93″ east longitude, and the time-zone longitude of Beijing time is E120°. Substituting into the above formula that is: the local time conversion value of Urumqi T'=22−(120−87)/15=19.8, which is translated to hours, minutes and seconds, namely 19:48, and a decimal part of the longitude is omitted in the formula (the accuracy is higher if the decimal part is not omitted).

After obtaining the first altitude angle h1, it was substituted into following formula to calculate the first azimuth angle:

$\cos(f1)=\sin(cw1)/(\cos(w1)\times\cos(h1)-\tan(w1)\times\tan(h1))$, wherein, f1 is the first azimuth angle, cw1 is the declination of the identified star, w1 is the latitude of the location of the imaging apparatus at photographing time of the starry sky image, and h1 is the first altitude angle S4, matching a right ascension and a declination of a target star in the star database.

For example, Comet Hale Bopp can be queried in the star database to get the right ascension of 23 h and the declination of 42.467°.

S5, obtaining a second altitude angle and a second azimuth angle according to the current location of the imaging apparatus and the current time, and the right ascension and the declination of the target star.

Under the premise that the right ascension and declination information, the current location and the current time are known, at the time the first altitude angle and the first azimuth angle are calculated, the second altitude angle and the second azimuth angle are calculated:

the second altitude angle is calculated by following formula:

$\sin(h2)=\sin(w2)\times\sin(cw2)+\cos(w2)\times\cos(cw2)\times\cos(t2\times 15)$, wherein, h2 is the second altitude angle, w2 is the latitude of the current location of the photographing device, cw2 is the declination of the target star, and t2 is a celestial time angle of the target star, wherein, t2=100/15+n2×24/365.2422+T2'−cj2/15, wherein, n2 is number of days from New Year's Day in the current year to observation time of the target star, T2' is the time conversion value of the observation time of the target star at the current location of the imaging apparatus, and cj2 is the right ascension of the target star, T2'=T2−ΔT2=T2 (sj2−j2)/15, wherein, T2' is the time conversion value of the current time of the current time at the current location of the imaging apparatus, T2 is time-zone time, sj2 is the longitude of the time zone, and j2 is the longitude of the current location of the imaging apparatus.

the second azimuth angle is calculated by following formula:

cos(f2)=sin(cw2)/(cos(w2)×cos(h2)−tan(w2)×tan(h2)), wherein, f2 is the second azimuth angle, cw2 is the declination of the target star, w2 is the latitude of the current location of the imaging apparatus, and h2 is the second altitude angle.

S6, adjusting the altitude angle of the telescope from the first altitude angle to the second altitude angle, and adjusting the azimuth angle of the telescope from the first azimuth angle to the second azimuth angle.

Figure 2:
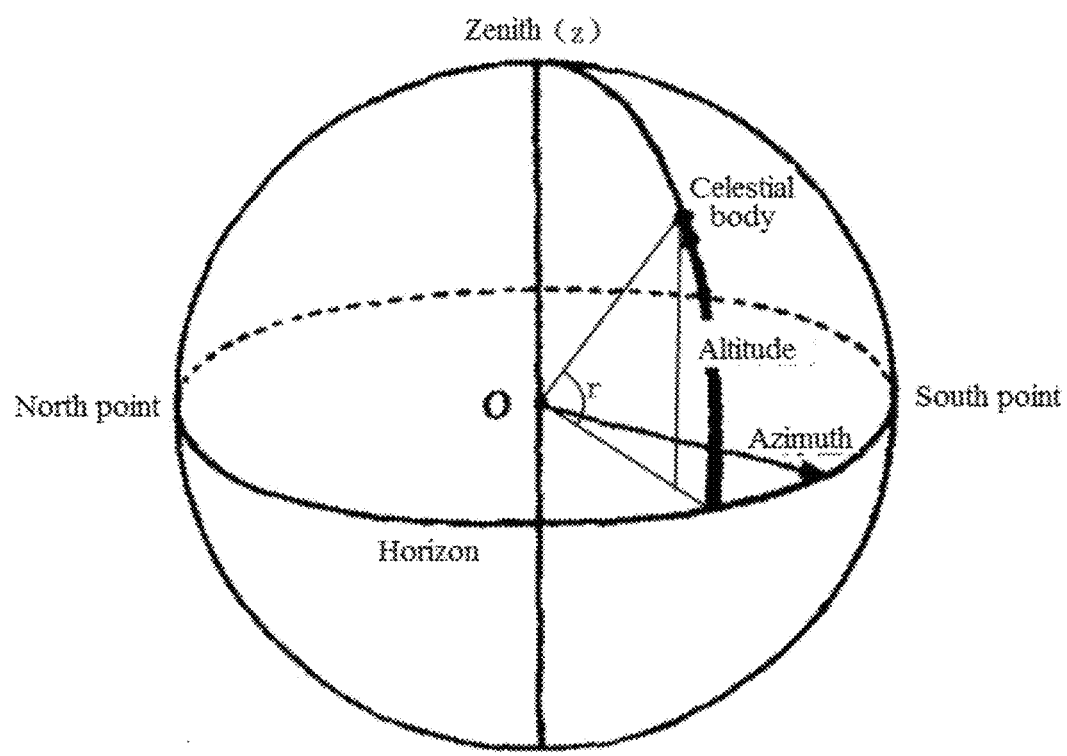
FIG. 2 is schematic diagram of an altitude angle and an azimuth angle for a celestial body provided by an embodiment of the present disclosure.

After two calculations, the first altitude angle and the first azimuth angle at photographing time of the starry sky image, and the second altitude angle and the second azimuth angle of the target star are obtained respectively. The difference values between the latter and the former are the angle adjustment amplitudes of the telescope, the principle is shown in FIG. 2. The angle between the line of the celestial body and the center of the sphere and its projection on the horizon is the altitude angle, the altitude angle of the celestial body in the upper hemisphere is positive, and the altitude angle of the celestial body in the lower hemisphere is negative, and the altitude angle r in FIG. 2 is positive. The projection of the line connecting the celestial body and the center of the sphere on the horizon is the azimuth angle. Here, it is necessary to establish an azimuth coordinate system, such as the south point and north point in FIG. 2, and the unmarked east point and west point. After the azimuth coordinate system is established, the azimuth angle of the telescope can be adjusted clockwise or counterclockwise according to the angle difference.

The principle of the present disclosure for realizing fast star searching is to identify the star that was photographed, based on a starry sky image as a reference which is photographed at will, and the calculated first altitude angle and first azimuth angle are actually the altitude angle and azimuth angle of the star in the celestial body obtained by image recognition, the altitude/azimuth angles captured the star are used to reversely derive the current altitude/azimuth angles of the imaging apparatus.

In the adjustment process of the azimuth angle, it is also necessary to establish an azimuth coordinate system through a geomagnetic sensor, that is, to determine the direction of the azimuth angle adjustment, and adjust the azimuth angle/altitude angle of the device to the second azimuth angle/second altitude angle in a manual or motor driven manner. After that, the image sensor is activated to photograph the current star image, that is, the target star image can be obtained.

Figure 3:
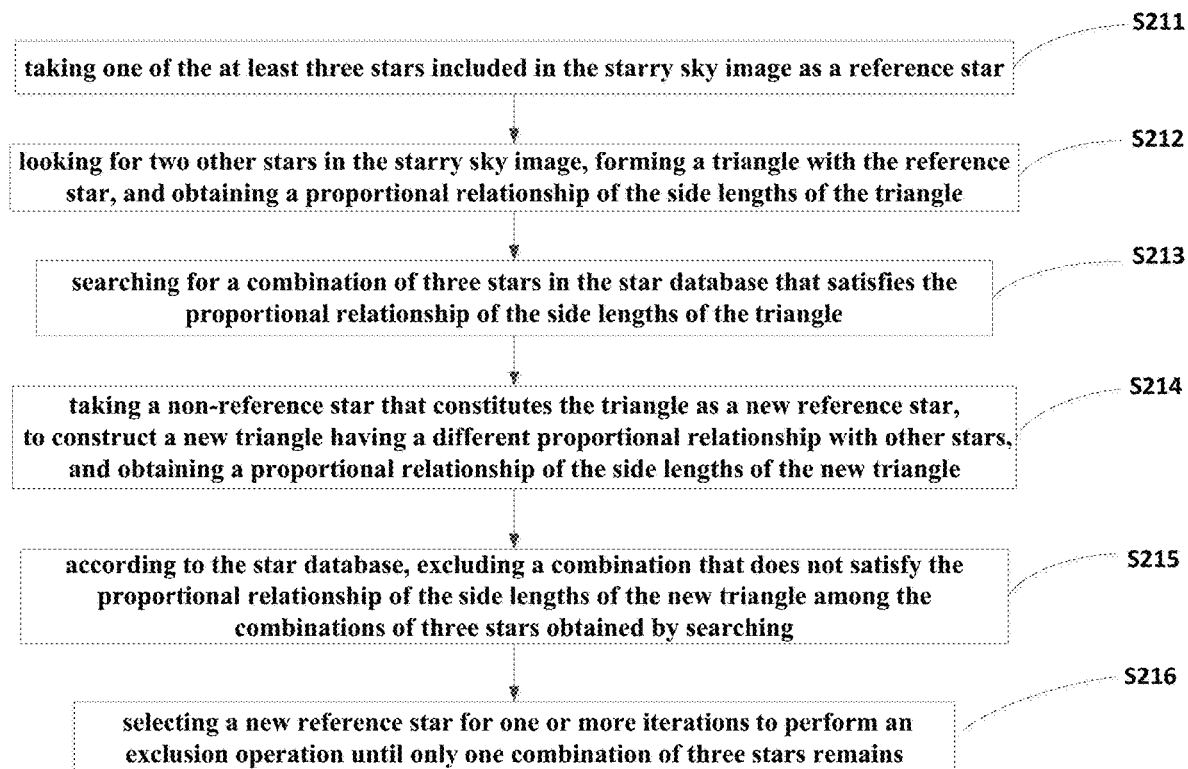
FIG. 3 is a flow chart of a first star image identification method provided by an embodiment of the present disclosure.

In an optional embodiment of the present disclosure, referring to FIG. 3, identifying a star in the photographed starry sky image according to a star database comprises the following procedures:

S211, taking one of the at least three stars included in the starry sky image as a reference star.

In an embodiment, a star with a larger brightness in the middle of the image is selected as the reference star.

S212, looking for two other stars in the starry sky image, forming a triangle with the reference star, and obtaining a proportional relationship of side lengths of the triangle.

In an embodiment, stars close to the reference star are selected to form a triangle.

S213, searching for a combination of three stars in the star database that satisfies the proportional relationship of side lengths of the triangle, the number of the combination(s) is one or more.

If there is one combination, one of the three stars can be directly determined as the reference star according to the shape of the combination of three stars; if there are multiple combinations, continue to perform the following S214-S216:

S214, taking a non-reference star that constitutes a triangle as a new reference star, to construct a new triangle having a different proportional relationship with other stars, and obtaining the proportional relationship of side lengths of the new triangle;

S215, according to the star database, excluding a combination that does not satisfy the proportional relationship of the side lengths of the new triangle among the combinations of three stars obtained by searching;

S216, selecting a new reference star for one or more iterations to perform an exclusion operation until only one combination of three stars remains.

It should be noted that the formation of a triangle by three stars in the embodiment of the present disclosure is essentially different from the compositional star search in the conventional art. The present disclosure does not belong to the composition technique, the formation of a triangle is only used to measure side lengths of the triangle, and therefore, even if the composition is not actually formed into a triangle, it is also possible to measure the distance between two of the three stars.

After the exclusion, the only combination of three stars is obtained, and one of the three stars is directly determined as the reference star according to the shape of the three stars.

Figure 4:
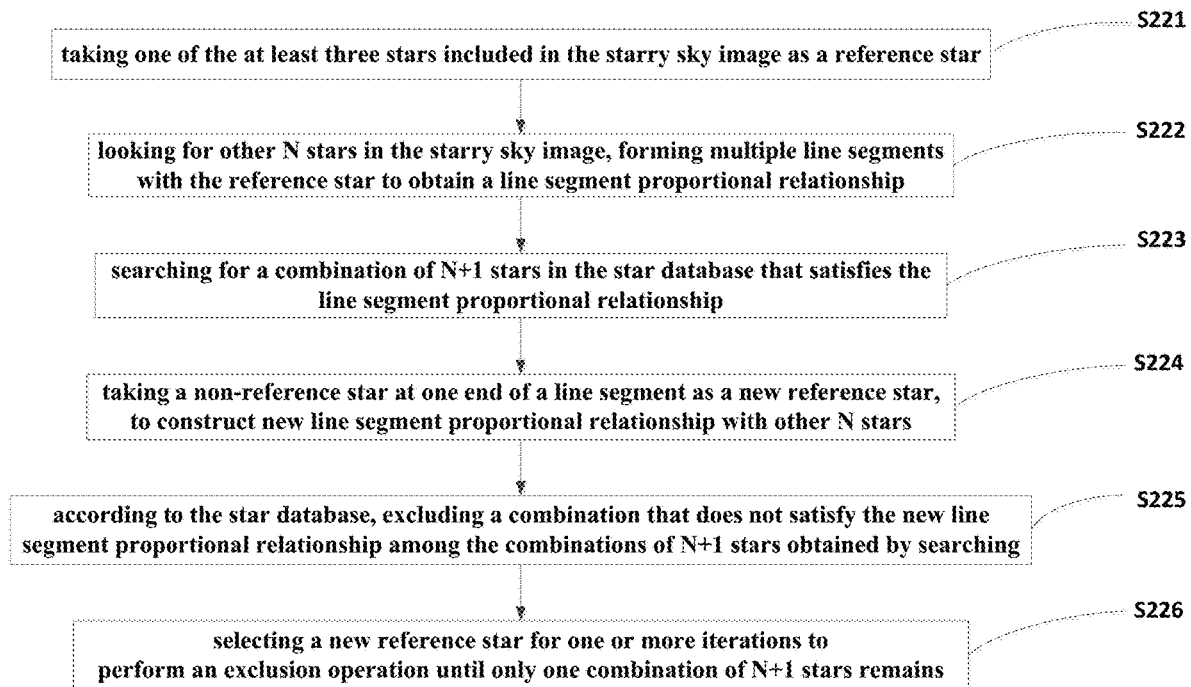
FIG. 4 is a flow chart of a second star image identification method provided by an embodiment of the present disclosure.

In another optional embodiment of the present disclosure, referring to FIG. 4, identifying a star in the photographed starry sky image according to a star database comprises the following procedures:

S221, taking one of the at least three stars included in the starry sky image as a reference star.

In an embodiment, a star with a larger brightness in the middle of the image is selected as the reference star.

S222, looking for other N stars in the starry sky image, forming multiple line segments with the reference star to obtain a line segment proportional relationship.

In an embodiment, stars closer to the reference star are selected to form line segments with the reference star.

S223, searching for a combination of N+1 stars in the star database that satisfies the line segment proportional relationship, the number of the combination(s) is one or more.

If there is one combination, one of the combination of stars can be directly determined as the reference star (the common point of N line segments); if there are multiple combinations, continue to perform the following S224-S226:

S224, taking a non-reference star at one end of a line segment as a new reference star, to construct a new line segment proportional relationship with other N stars;

S225, according to the star database, excluding a combination that does not satisfy the new line segment proportional relationship among the combinations of N+1 stars obtained by searching;

S226, selecting a new reference star for one or more iterations to perform an exclusion operation until only one combination of N+1 stars remains.

After the exclusion, the only combination of N+1 stars is obtained, and one of the stars is directly determined as the reference star (the common point of N line segments).

In the above two embodiments, before identifying a star in the photographed starry sky image according to a star database, it comprises: performing noise discriminant on each star in the photographed starry sky image, and the method for noise discriminant comprises the following procedures:

finding a central pixel of a luminous body in the starry sky image, and recording its brightness as $P_{max}$; using the central pixel as a center of a circle, and using $r_0$ as a radius to determine the circular range, calculating an average brightness in this range, and recording it as $P_0$; if $P_{max}-P_0<k*P_{max}$, adjusting $r_0$ to $r_0+r_{step}$ until $P_{max}-P_0 \geq k*P_{max}$, wherein, k is a set value of noise reduction coefficient, and $r_{step}$ is the radius step adjustment value; if $r_0 \geq r_{th}$, determining the luminous body to be a star, otherwise determining it to be a noise and deleting the pixel of the luminous body, wherein, $r_{th}$ is a set value of radius threshold, and $r_0$ is an adjusted new radius value.

In this embodiment, the de-noising preprocessing is performed by using the characteristic of a star with a stronger radiation force compared to the noise point, that is, the star is easier to radiate its light to the surroundings, so that the surrounding brightness is higher than the brightness around the noise point. In a preferred embodiment, k is preferably 0.05, that is, it is determined that the bright point radiates outward, so that if the radiation radius is less than the set radius threshold when the average brightness of the radiation area is less than 95% of the brightness of the bright point pixel, it is determined that the bright point is a noise, and the bright point is deleted from the starry sky image; otherwise, the bright point is determined to be a star, and the above $r_0$ is the latest adjusted radius value currently updated.

After the above process, it can be determined whether the bright point on the image is a star or a noise, and repeat the above process until the required number of stars is determined (as long as the number of stars is determined to reach the required number, the remaining bright points can be ignored). It should be noted that the de-noising operation on the first starry sky image in this embodiment is one of the preprocessing steps to realize the rapid identification of stars. The core of the present disclosure is to use the starry sky database to simulate the current telescope, and compare the actual starry sky image with the simulated starry sky image, to achieve no calibration and fast star search. Therefore, this embodiment only lists a preferred de-noising method, which does not limit the scope of protection of the present disclosure. Any one of the image de-noising methods in the conventional art can be applied to this application to realize the technical solution of the present disclosure, and solve the technical problems of non-calibration and fast star search, that is, all the de-noising methods in the conventional art fall into the protection scope claimed by this application.

Figure 5:
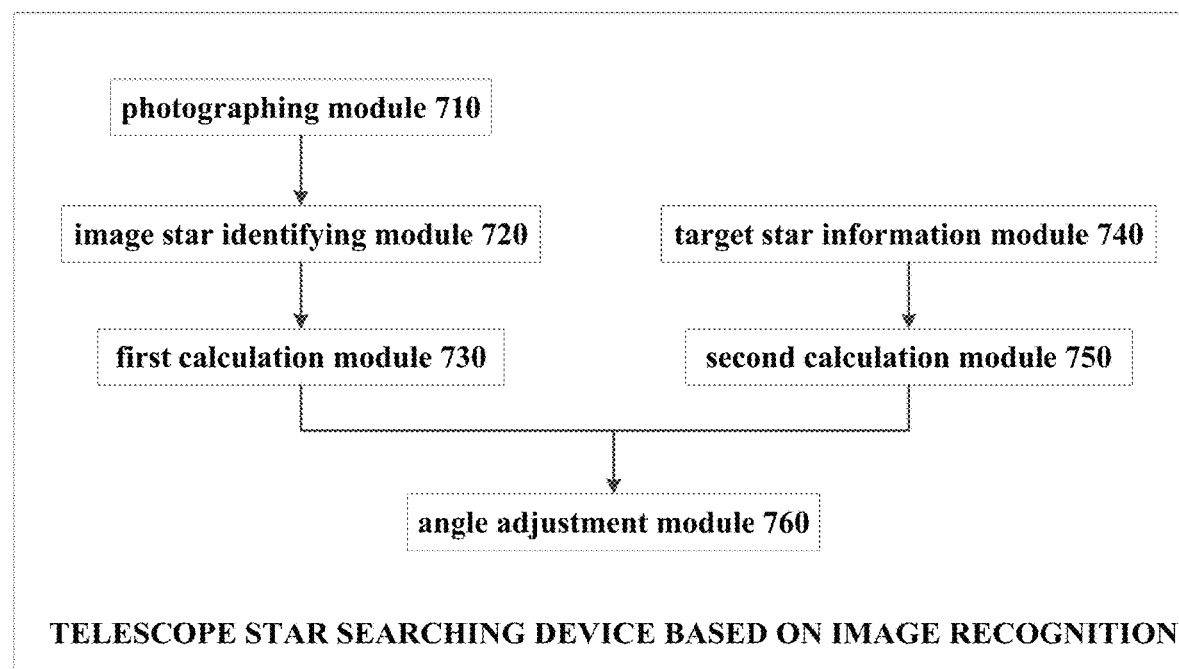
FIG. 5 is a module block diagram of a telescope star searching device based on image recognition provided by an embodiment of the present disclosure.

In another embodiment of the present disclosure, a telescope star searching device based on image recognition is provided, referring to FIG. 5, the device comprises the following modules:

a photographing module 710, used for photographing a starry sky image by using an imaging sensor of a telescope, where the starry sky image includes at least three stars;

an image star identifying module 720, used for identifying a star in the photographed starry sky image and matching a right ascension and a declination of the identified star according to a star database;

a first calculation module 730, used for obtaining a first altitude angle and a first azimuth angle according to a photographing time of the starry sky image, a location of an imaging apparatus, and the right ascension and the declination of the identified star, for the calculation method of the first calculation module 730, refer to the foregoing embodiment of the telescope star searching method based on image recognition, which is hereby incorporated by reference herein in its entirety;

a target star information module 740, used for matching a right ascension and a declination of a target star in the star database;

a second calculation module 750, used for obtaining a second altitude angle and a second azimuth angle according to the current location of the imaging apparatus and the current time, and the right ascension and the declination of the target star, for the calculation method of the second calculation module 750, refer to the foregoing embodiment of the telescope star searching method based on image recognition, which is hereby incorporated by reference herein in its entirety;

an angle adjustment module 760, used for adjusting the altitude angle of the telescope from the first altitude angle to the second altitude angle, and adjusting the azimuth angle of the telescope from the first azimuth angle to the second azimuth angle.

It should be noted that when the telescope star searching device based on image recognition provided in the above embodiment performs star search, only the above-mentioned functional modules are divided into examples for illustration. In actual applications, according to the needs, the above functions are allocated by different function modules to complete, that is, the internal structure of the telescope star searching device based on image recognition is divided into different function modules to complete all or part of the functions described above. In addition, the telescope star searching device based on image recognition provided in this embodiment and the telescope star searching method based on image recognition provided in the above embodiments belong to the same concept, therefore, for the specific implementation process, please refer to the method embodiment, which will not be repeated here.

In another embodiment of the present disclosure, a telescope using the star searching method described in the above embodiment to search stars is provided.

The present disclosure provides a method, device and telescope for fast search of stars, which are based on starry sky images photographed at will after the telescope is turned on (on the premise of ensuring that the stars in the images can be recognized), the altitude angle and the azimuth angle of the stars in the image are calculated as the initial state, and the altitude angle and azimuth angle of the target star are taken as the target state, and the angle of the telescope is adjusted according to the angle differences between the target state and the initial state, which can realize the fast search of the target star.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A telescope star searching method based on image recognition, comprising:
    photographing a starry sky image by using an imaging sensor of a telescope, wherein the starry sky image includes at least three stars;
    identifying a star in the starry sky image and matching a right ascension and a declination of the star according to a star database;
    obtaining a first altitude angle and a first azimuth angle according to a photographing time of the starry sky image, a location of an imaging apparatus, and the right ascension and the declination of the star;
    matching a right ascension and a declination of a target star in the star database;
    obtaining a second altitude angle and a second azimuth angle according to a current location of the imaging apparatus and a current time, and the right ascension and the declination of the target star; and
    adjusting the altitude angle of the telescope from the first altitude angle to the second altitude angle, and adjusting the azimuth angle of the telescope from the first azimuth angle to the second azimuth angle;
    wherein there is no need to perform error calibration in advance before finding a target star.

2. The star searching method according to claim 1, wherein the first altitude angle is calculated by following formula:
    $\sin(h1)=\sin(w1)\times\sin(cw1)+\cos(w1)\times\cos(cw1)\times\cos(t1\times 15)$, wherein, h1 is the first altitude angle, w1 is a latitude of the location of the imaging apparatus at photographing time of the starry sky image, cw1 is the declination of the identified star, and t1 is a celestial time angle of the identified star;
    the second altitude angle is calculated by following formula:
    $\sin(h2)=\sin(w2)\times\sin(cw2)+\cos(w2)\times\cos(cw2)\times\cos(t2\times 15)$, wherein, h2 is the second altitude angle, w2 is a latitude of the current location of the imaging apparatus, cw2 is the declination of the target star, and t2 is a celestial time angle of the target star.

3. The star searching method according to claim 2, wherein the celestial time angle of the identified star is calculated by following formula:
    $t1=100/15+n1\times 24/365.2422+T1'-cj1/15$, wherein, n1 is number of days from New Year's Day in the current year to photographing time of the starry sky image, T1' is a time conversion value of the photographing time of the starry sky image at the current location of the imaging apparatus, and cj1 is the right ascension of the identified star;
    the celestial time angle of the target star is calculated by following formula:
    $t2=100/15+n2\times 24/365.2422+T2'-cj2/15$, wherein, n2 is number of days from New Year's Day in the current year to observation time of the target star, T2' is a time conversion value of the observation time of the target star at the current location of the imaging apparatus, and cj2 is the right ascension of the target star.

4. The star searching method according to claim 2, wherein the first azimuth angle is calculated by following formula:
    $\cos(f1)=\sin(cw1)/(\cos(w1)\times\cos(h1)-\tan(w1)\times\tan(h1))$, wherein, f1 is the first azimuth angle, cw1 is the declination of the identified star, w1 is the latitude of the location of the imaging apparatus at photographing time of the starry sky image, and h1 is the first altitude angle;
    the second azimuth angle is calculated by following formula:
    $\cos(f2)=\sin(cw2)/(\cos(w2)\times\cos(h2)-\tan(w2)\times\tan(h2))$, wherein, f2 is the second azimuth angle, cw2 is the declination of the target star, w2 is the latitude of the current location of the imaging apparatus, and h2 is the second altitude angle.

5. The star searching method according to claim 1, wherein identifying the star in the starry sky image according to the star database comprises:
    taking one of the at least three stars included in the starry sky image as a reference star;
    looking for two other stars in the starry sky image, forming a triangle with the reference star, and obtaining a proportional relationship of side lengths of the triangle;
    searching for a combination of three stars in the star database that satisfies the proportional relationship of side lengths of the triangle, the number of the combination is one or more;
    if the number of the combination is more than one, further comprising:
    taking a non-reference star that constitutes the triangle as a new reference star, to construct a new triangle comprising a different proportional relationship with other stars, and obtaining the proportional relationship of side lengths of the new triangle;
    according to the star database, excluding a combination that does not satisfy the proportional relationship of the side lengths of the new triangle among combinations of three stars obtained by searching; and
    selecting a new reference star for one or more iterations to perform an exclusion operation until only one combination of three stars remains.

6. The star searching method according to claim 1, wherein identifying a star in the starry sky image according to the star database comprises:
    taking one of the at least three stars included in the starry sky image as a reference star;
    looking for other N stars in the starry sky image, forming multiple line segments with the reference star to obtain a line segment proportional relationship; and
    searching for a combination of N+1 stars in the star database that satisfies the line segment proportional relationship, the number of the combination is one or more;
    if the number of the combination is more than one, further comprising:
    taking a non-reference star at one end of a line segment as a new reference star, to construct new line segment proportional relationship with other N stars;

according to the star database, excluding a combination that does not satisfy the new line segment proportional relationship among combinations of N+1 stars obtained by searching; and selecting a new reference star for one or more iterations to perform an exclusion operation until only one combination of N+1 stars remains.

7. The star searching method according to claim 5, wherein before identifying the star in the starry sky image according to the star database, performing noise discriminant on each star in the starry sky image, comprising:

finding a central pixel of a luminous body in the starry sky image, and recording a brightness as $P_{max}$;

using the central pixel as a center of a circle, and using r0 as a radius to determine a circular range, calculating an average brightness in this range, and recording the average brightness as $P_0$;

if $P_{max}-P_0<k*P_{max}$, adjusting $r_0$ to $r_0+r_{step}$ until $P_{max}-P_0 \geq k*P_{max}$, wherein, k is a set value of noise reduction coefficient, and $r_{step}$ is a radius step adjustment value; and if $r_0 \geq r_{th}$, determining the luminous body to be a star, otherwise determining the luminous body to be a noise and deleting the pixel of the luminous body, wherein, $r_{th}$ is a set value of radius threshold, and $r_0$ is an adjusted new radius value.

8. The star searching method according to claim 3, wherein a time conversion value of a time at the current location of the imaging apparatus is calculated by following formula:

T'=T−ΔT=T−(sj−j)/15, wherein, T' is a time conversion value at the current location of the imaging apparatus, T is time-zone time, sj is a longitude of the time zone, and j is a longitude of the current location of the imaging apparatus.

9. A telescope star searching device based on image recognition, comprising:

photographing a starry sky image by using an imaging sensor of a telescope, where the starry sky image includes at least three stars;

identifying a star in the starry sky image and matching a right ascension and a declination of the star according to a star database;

obtaining a first altitude angle and a first azimuth angle according to a photographing time of the starry sky image, a location of an imaging apparatus, and the right ascension and the declination of the star;

matching a right ascension and a declination of a target star in the star database;

obtaining a second altitude angle and a second azimuth angle according to a current location of the imaging apparatus and a current time, and the right ascension and the declination of the target star; and adjusting the altitude angle of the telescope from the first altitude angle to the second altitude angle, and adjusting the azimuth angle of the telescope from the first azimuth angle to the second azimuth angle;

wherein there is no need to perform error calibration in advance before finding a target star.

10. A telescope for searching stars using the star searching method according to claim 1.

11. The star searching device according to claim 9, wherein the first altitude angle is calculated by following formula:

sin(h1)=sin(w1)×sin(cw1)+cos(w1)×cos(cw1)×cos(t1×15), wherein, h1 is the first altitude angle, w1 is a latitude of the location of the imaging apparatus at photographing time of the starry sky image, cw1 is the declination of the identified star, and t1 is a celestial time angle of the identified star; and the second altitude angle is calculated by following formula:

sin(h2)=sin(w2)×sin(cw2)+cos(w2)×cos(cw2)×cos(t2×15), wherein, h2 is the second altitude angle, w2 is a latitude of the current location of the imaging apparatus, cw2 is the declination of the target star, and t2 is a celestial time angle of the target star.

12. The star searching device according to claim 11, wherein the celestial time angle of the identified star is calculated by following formula:

t1=100/15+n1×24/365.2422+T1'−cj1/15, wherein, n1 is number of days from New Year's Day in the current year to photographing time of the starry sky image, T1' is a time conversion value of the photographing time of the starry sky image at the current location of the imaging apparatus, and cj1 is the right ascension of the identified star; and the celestial time angle of the target star is calculated by following formula:

t2=100/15+n2×24/365.2422+T2'−cj2/15, wherein, n2 is number of days from New Year's Day in the current year to observation time of the target star, T2' is a time conversion value of the observation time of the target star at the current location of the imaging apparatus, and cj2 is the right ascension of the target star.

13. The star searching device according to claim 11, wherein the first azimuth angle is calculated by following formula:

cos(f1)=sin(cw1)/(cos(w1)×cos(h1)−tan(w1)×tan(h1)), wherein, f1 is the first azimuth angle, cw1 is the declination of the identified star, w1 is the latitude of the location of the imaging apparatus at photographing time of the starry sky image, and h1 is the first altitude angle;

the second azimuth angle is calculated by following formula:

cos(f2)=sin(cw2)/(cos(w2)×cos(h2)−tan(w2)×tan(h2)), wherein, f2 is the second azimuth angle, cw2 is the declination of the target star, w2 is the latitude of the current location of the imaging apparatus, and h2 is the second altitude angle.

14. The star searching device according to claim 9, wherein identifying a star in the photographed starry sky image according to a star database comprises:

taking one of the at least three stars included in the starry sky image as a reference star;

looking for two other stars in the starry sky image, forming a triangle with the reference star, and obtaining a proportional relationship of side lengths of the triangle; and searching for a combination of three stars in the star database that satisfies the proportional relationship of side lengths of the triangle, the number of the combination is one or more;

if the number of the combination is more than one, further comprising:

taking a non-reference star that constitutes the triangle as a new reference star, to construct a new triangle comprising a different proportional relationship with other stars, and obtaining the proportional relationship of side lengths of the new triangle;

according to the star database, excluding a combination that does not satisfy the proportional relationship of the side lengths of the new triangle among combinations of three stars obtained by searching; and selecting a new reference star for one or more iterations to perform an exclusion operation until only one combination of three stars remains.

15. The star searching device according to claim 9, wherein identifying a star in the starry sky image according to the star database comprises:

taking one of the at least three stars included in the starry sky image as a reference star;

looking for other N stars in the starry sky image, forming multiple line segments with the reference star to obtain a line segment proportional relationship; and searching for a combination of N+1 stars in the star database that satisfies the line segment proportional relationship, the number of the combination is one or more;

if the number of the combination is more than one, further comprising:

taking a non-reference star at one end of a line segment as a new reference star, to construct new line segment proportional relationship with other N stars;

according to the star database, excluding a combination that does not satisfy the new line segment proportional relationship among combinations of N+1 stars obtained by searching; and selecting a new reference star for one or more iterations to perform an exclusion operation until only one combination of N+1 stars remains.

16. The star searching device according to claim 14, wherein before identifying a star in the starry sky image according to the star database, performing noise discriminant on each star in the starry sky image, comprising:

finding a central pixel of a luminous body in the starry sky image, and recording a brightness as $P_{max}$;

using the central pixel as a center of a circle, and using r0 as a radius to determine a circular range, calculating an average brightness in this range, and recording the average brightness as $P_0$;

if $P_{max}-P_0<k*P_{max}$, adjusting $r_0$ to $r_0+r_{step}$ until $P_{max}-P_0 \geq k*P_{max}$, wherein, k is a set value of noise reduction coefficient, and $r_{step}$ is a radius step adjustment value; and if $r_0 \geq r_{th}$, determining the luminous body to be a star, otherwise determining the luminous body to be a noise and deleting the pixel of the luminous body, wherein, $r_{th}$ is a set value of radius threshold, and $r_0$ is an adjusted new radius value.

17. The star searching device according to claim 12, wherein a time conversion value of a time at the current location of the imaging apparatus is calculated by following formula:

T'=T−ΔT=T−(sj−j)/15, wherein, T' is a time conversion value at the current location of the imaging apparatus, T is time-zone time, sj is a longitude of the time zone, and j is a longitude of the current location of the imaging apparatus.

\* \* \* \* \*